UNITED STATES PATENT OFFICE.

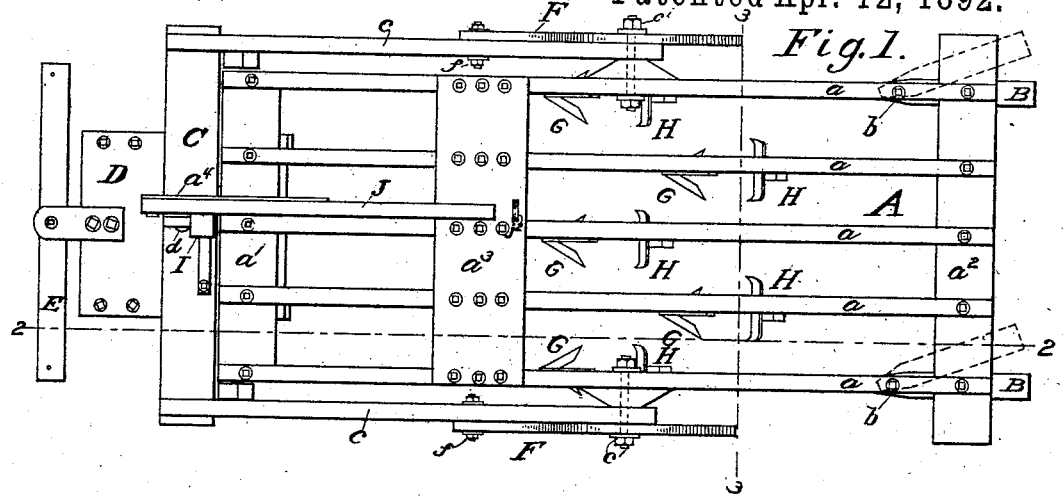

WILLIAM D. ARNETT, OF CALDWELL, IDAHO.

GRADING-MACHINE.

SPECIFICATION forming part of Letters Patent No. 472,569, dated April 12, 1892.

Application filed June 25, 1891. Serial No. 397,507. (No model.)

*To all whom it may concern:*

Be it known that I, WILLIAM D. ARNETT, of Caldwell, county of Ada, and State of Idaho, have invented a new and useful Improvement in Grading-Machines, of which the following is a specification.

My machine is intended to be drawn over the surface of the ground to level or grade the same by moving the earth from the elevations into the hollows or depressions; and it consists, essentially, in a jointed frame provided with sustaining-runners, plows, and scrapers, and with means for adjusting the frame to control the action of the plows and scrapers, as hereinafter explained in detail.

Figure 1 is a top plan view of my machine; Fig. 2, a longitudinal section of the same on the line 2 2; Fig. 3, a transverse section on the line 3 3 of the preceding figures.

A represents a rigid horizontal frame composed of longitudinal beams $a$, firmly secured to the cross-timbers $a'$ $a^2$ $a^3$. At the rear end the frame is sustained by two underlying runners B, attached thereto by vertical pivots $b$ at the forward end, so that they may swing laterally, as indicated in dotted lines, and thus facilitate the turning of the machine. At the forward end the frame has a sustaining-arm $a^4$, which rests normally on a draft-frame C, which in turn rests upon a sled or runner D, connected to the draft-frame by a vertical pin or king-bolt $d$ and provided with a doubletree E or other means for the attachment of the draft-animals. The draft-frame C is constructed with arms $c$, extending rearward along the sides of the main frame A and connected thereto midway of its length by horizontal pivots $c'$, in order that the forward end of the main frame may rise and fall independently. At the rear end of the draft-frame there are two runners F, attached thereto, as shown, or to the main frame, if preferred, in order to limit the falling motion of the latter when the front or rear runners ride into depressions on the surface. These runners are attached by horizontal pivots $f$ at the front and secured by bolts, which may be changed in position to raise or lower the runner. To the main frame A at or near its middle is attached a series of plows or shares G of the form shown or of any other form adapted to loosen the soil, and behind each of these plows there is secured to the frame a broad-faced scraper-blade or shovel H, adapted to carry the loosened soil forward into the hollows. On the front end of the draft-frame C there is a standard I, and on the standard there is pivoted a hand-lever J, connected by link $j$ to the arm $a^4$ on the front end of the main frame, so that by depressing the rear end of the lever the front end of the main frame may be raised and the plows and shovels thereby lifted out of action. A hook $j^2$ on the main frame serves to hold the lever and lock the frame in its elevated position, as indicated by dotted lines. As the machine is drawn forward it is sustained normally by the front and rear runners, and the plows and shovels act, as in Fig. 2, on the elevated portions of the surface, and not elsewhere, to loosen the soil and advance the same into the hollows. The sinking of the plows into the hollows is prevented by the contact of the main frame with the front supports, so that the machine bridges over the intervals between elevations. The runners at the middle limit the depth to which the plows can enter the soil whenever the front or rear runners, entering a depression, become inoperative for this purpose.

It is manifest that plows, shares, or scrapers of any suitable form may be used on the frame to loosen and move the earth, and the word "plows" is used in the following claims in a generic sense, as including any means the equivalent of those herein shown for the purpose named.

What I claim as my invention is—

1. The main frame provided with the plows, shovels, and rear runners, in combination with the front sled or runner and the intermediate draft-frame connected with the main frame by horizontal pivots and with the front runner by the vertical pivot or king-bolt.

2. The main frame having the plows and rear runners, in combination with the front sled, the intermediate draft-frame jointed to the sled and main frame, and adjusting devices, substantially as shown, connecting the frame.

3. In combination, the main frame with plows and the rear runners, the front sled, the intermediate draft-frame jointed to the main frame and sled, substantially as shown, and the intermediate runners to limit the depth of the plows.

In testimony whereof I hereunto set my hand, this 10th day of June, 1891, in the presence of two attesting witnesses.

WILLIAM D. ARNETT.

Witnesses:
  T. C. ROCKWELL,
  SWAIN BEATY.